US011230381B2

(12) United States Patent
Frost et al.

(10) Patent No.: US 11,230,381 B2
(45) Date of Patent: Jan. 25, 2022

(54) PASSENGER SUITE WITH TABLE MECHANISM WITH VERTICAL, TRANSLATIONAL AND ROTATIONAL ADJUSTMENT

(71) Applicant: B/E Aerospace, Inc., Winston-Salem, NC (US)

(72) Inventors: Ian L. Frost, Winston-Salem, NC (US); Gerry J. Overhiser, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 258 days.

(21) Appl. No.: 16/542,725

(22) Filed: Aug. 16, 2019

(65) Prior Publication Data
US 2020/0354062 A1    Nov. 12, 2020

Related U.S. Application Data

(60) Provisional application No. 62/844,497, filed on May 7, 2019, provisional application No. 62/844,517, filed on May 7, 2019.

(51) Int. Cl.
*B64D 11/06*   (2006.01)

(52) U.S. Cl.
CPC ...... *B64D 11/0605* (2014.12); *B64D 11/0604* (2014.12); *B64D 11/0606* (2014.12)

(58) Field of Classification Search
CPC ............ B64D 11/0604; B64D 11/0605; B64D 11/0606; E05F 3/20; A47B 5/04; E05Y 2201/21; E05Y 2900/20
USPC ......................................... 244/118.6; 108/69
See application file for complete search history.

(56) References Cited

U.S. PATENT DOCUMENTS

| 2,605,155 | A | * | 7/1952 | Lewis ..................... A47B 23/02 |
| | | | | 108/139 |
| 2,709,818 | A | | 6/1955 | Freese |
| 3,535,720 | A | | 10/1970 | Woods |
| 8,020,808 | B2 | | 9/2011 | Collins et al. |
| 8,528,968 | B2 | | 9/2013 | Moulton et al. |
| 9,114,879 | B2 | | 8/2015 | Ligonniere et al. |

(Continued)

FOREIGN PATENT DOCUMENTS

WO        9956585 A1    11/1999

OTHER PUBLICATIONS

Extended Search Report for European Application No. 19216028.1 dated Jul. 27, 2020, 7 pages.

*Primary Examiner* — Brady W Frazier
(74) *Attorney, Agent, or Firm* — Suiter Swantz pc llo

(57) ABSTRACT

An adjustable table assembly for use in a passenger cabin environment such as an aircraft passenger suite including a passenger seat. The table assembly includes a fixed rail assembly attached to a monument, a support column rotatably mounted on the rail assembly, and a table mounted on the support column, the table having a stowed position and deployed positions in a first direction generally toward the passenger seat from the stowed position. The table has a predetermined stowage orientation at which the support column and table are movable along the rail assembly in a second direction opposite the first direction to the stowed position, and the rail assembly prevents the table from moving into the stowed position when the table is rotated out of the predetermined stowage orientation.

17 Claims, 15 Drawing Sheets

(56) References Cited

U.S. PATENT DOCUMENTS

| | | | |
|---|---|---|---|
| 9,776,723 B2 | 10/2017 | Gow et al. | |
| 10,023,315 B2 | 7/2018 | Kuyper et al. | |
| D865,374 S * | 11/2019 | Yang | A47B 3/002 |
| | | | D6/310 |
| 2006/0075934 A1* | 4/2006 | Ram | B64D 11/00155 |
| | | | 108/44 |
| 2014/0374551 A1* | 12/2014 | Carter | A47B 3/002 |
| | | | 248/188.5 |
| 2016/0376008 A1* | 12/2016 | Kuyper | B64D 11/0605 |
| | | | 244/122 R |

* cited by examiner

PASSENGER SUITE WITH TABLE MECHANISM WITH VERTICAL, TRANSLATIONAL AND ROTATIONAL ADJUSTMENT

CROSS REFERENCE TO RELATED APPLICATION

This application claims the benefit of priority of each of U.S. provisional patent application No. 62/844,497, filed May 7, 2019, entitled "Passenger Suite with Table Mechanism with Vertical, Translational and Rotational Adjustment," and U.S. provisional patent application No. 62/844,517, filed May 7, 2019, entitled "Damped Table Hinge," each of which is incorporated herein in its entirety by this reference. This application is related to a commonly owned and concurrently filed U.S. non-provisional patent application titled "Dampening Hinge and Table Assemblies Including the Same," which is incorporated herein in its entirety by this reference.

BACKGROUND

Airline operators offer different passenger seating classes with varying levels of amenities at varying ticket costs to fit a variety of budgets and traveler preferences. Conventional economy seating classes typically include closely spaced rows of seats for economic and space efficiency. Business and first-class seating classes typically include larger living spaces and more generous amenities.

One amenity found in many types of seating classes is a tray table, sometimes referred to as a meal table. In economy seating classes, tray tables may deploy from against the backside of a forward row of seats for use by an aft-positioned row of seats. In a first row of seats, tray tables may be attached to complex hinge mechanisms for vertical and rotational deployment from within an arm rest bay. Tray tables may be constructed with separated sections for compact packaging and stowage, wherein the tray table can be deployed and expanded to increase the tabletop size. Tabletop sections may be hinged together such that one table section folds against the other. While conventional table mounting arrangements permit deployment and compact stowage, such arrangements provide little or no other adjustability, which may become appreciated or required by customers expecting premium accommodations.

Accordingly, improvements are needed in table assemblies and passenger suites.

SUMMARY OF THE INVENTIVE ASPECTS

To achieve the foregoing and other advantages, the inventive aspects disclosed herein are directed to an aircraft passenger suite including a passenger seat, a fixed rail assembly attached to a monument, a support column rotatably mounted on the rail assembly, and a table mounted on the support column, the table having a stowed position and deployed positions in a first direction generally toward the passenger seat from the stowed position. The table has a predetermined stowage orientation at which the support column and table are movable along the rail assembly in a second direction opposite the first direction to the stowed position, and the rail assembly prevents the table from moving into the stowed position when the table is rotated out of the predetermined stowage orientation.

In some embodiments, the rail assembly includes a control rail having a first portion extending in the first direction and along which the support column and table are rotatable around a vertical axis defined by the support column, and a second portion extending in the second direction and along which the support column and table are not rotatable around the vertical axis.

In some embodiments, the first portion of the control rail has a first lateral width, the second portion of the control rail has a second lateral width greater than the first lateral width, and the support column has a radially reduced portion that faces the control rail when the table is in the predetermined stowage orientation.

In some embodiments, at least a portion of the support column has a vertical circular cylindrical wall having a radius, and the radially reduced portion is reduced relative to the radius.

In some embodiments, the radially reduced portion is formed by a chord surface.

In some embodiments, a brake automatically prevents movement of the support column and table along the rail assembly in a braked condition. When a user applies force in the first direction or second direction, the brake is switched to a freed condition permitting movement of the table along the rail assembly.

In some embodiments, a vertical position of the table is adjustable.

In some embodiments, the table includes a base panel mounted on the support column, and a first folding panel pivotally attached to the base panel, wherein the first folding panel is pivotable relative to the base panel between a folded position and an unfolded position.

In some embodiments, the table includes a second folding panel pivotally attached to the base panel.

In some embodiments, a wall is positioned forward of the passenger seat in the second direction, the base panel has a first linear end to which the first folding panel is pivotally attached, and the predetermined stowage orientation is defined by the first linear end facing the wall.

In some embodiments, in the stowed position of the table, the first folding panel is in the folded position and the first linear end of the base panel faces, and is adjacent, the wall.

In some embodiments, the monument includes a bed.

In another aspect, the inventive concepts disclosed herein are directed to an adjustable table assembly installable in an aircraft passenger cabin. The table assembly includes a fixed rail assembly attachable to a fixed structure in an aircraft passenger cabin. A support column is rotatably mounted on the rail assembly. A table mounted on the support column has a stowed position and deployed positions in a first direction from the stowed position. The table has a predetermined stowage orientation at which the support column and table are movable along the rail assembly in a second direction opposite the first direction to the stowed position, and the rail assembly prevents the table from moving into the stowed position when the table is rotated out of the predetermined stowage orientation.

In some embodiments, the table includes a base panel mounted on the support column, and a first folding panel pivotally attached to the base panel, wherein the first folding panel is pivotable relative to the base panel between a folded position and an unfolded position.

In some embodiments, the base panel has a first linear end to which the first folding panel is pivotally attached, and wherein the predetermined stowage orientation is defined by the first linear end facing the second direction or first direction.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

Figure 1:
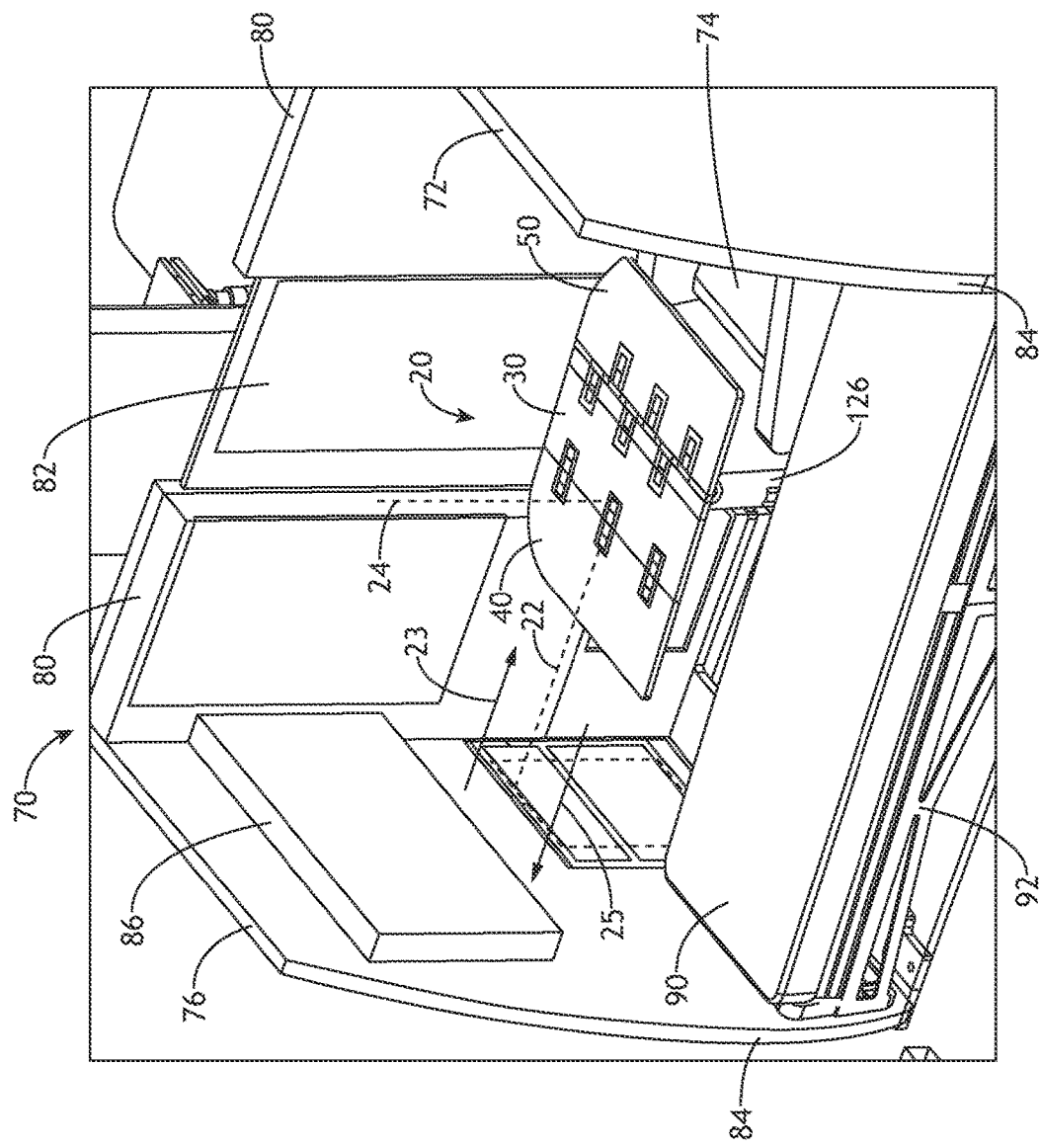
FIG. 1 is a perspective view of an aircraft passenger suite, according to the present disclosure, shown with a trifold table thereof in a deployed position and an unfolded condition.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Inventive concepts disclosed herein are generally directed to a passenger suite layout including a table mechanism repositionable within the suite and reconfigurable for different uses. The suite generally includes an adjustable seat positioned to one side of a fixed bed. The table mechanism is mounted to track or rail assembly along a side of the bed adjacent the seat. The table mechanism includes a folding table system (e.g., bifold or trifold) including dampened hinges. The table mechanism(s) provide three-degrees of freedom including forward/aft movement (i.e., translational movement), vertical movement, and rotational movement. Each motion component may be held in place by a brake or other mechanism. In some embodiments, in a normal passenger use state all brakes are applied. In some embodiments, actuators release the brakes to permit movement. In some embodiments, user force is applied to translate and/or rotate the table top.

The table illustrated in the drawings is shown as a trifold table 20, having three leaves or panels, as a non-limiting example. Other tables, such as single panel tables having one leaf, and bifold tables having two leaves or panels, are within the scope of these descriptions. These are all non-limiting examples. The table 20 is shown in an aircraft passenger environment, referenced and described below as a passenger suite 70. In some implementations, the table as described and illustrated is provided without the features of the suite 70. For example, a folding table in an adjustable table assembly can be moved and supported by a support assembly, referenced for example in the following as the support assembly 110, along a fixed rail assembly 104 in other environments with or without the bed 90 and passenger seat 74. The drawings illustrate a single table mounted to the rail assembly as a non-limiting example. In some implementations, two tables may be mounted to the same rail assembly for independent movement thereon.

The illustrated trifold table 20 is mounted upon a support column 126 by which the trifold table can be translated fore and aft by movement along a longitudinal axis 22, and up and down along a vertical axis 24. For convenient convention, a first longitudinal direction 23 toward a passenger seat is treated as an aft or rearward direction with regard to the aircraft fuselage in which the passenger suite represented in FIG. 1. A second longitudinal direction 25, opposite the first direction 23, is treated as a forward direction. In other implementations, the first longitudinal direction 23 may be forward or another direction with respect to an aircraft. The trifold table 20 is also rotatable around the vertical axis 24 by a rotation function of the support column. Movements of the trifold table 20 are explained in the following descriptions after descriptions of its folding and unfolding functions.

The trifold table 20 has three interconnected generally planar rigid panels, two of which hinge or fold to stowed positions. A generally planar and rigid first panel, referenced as a central base panel 30, is mounted from below on a support column. The base panel 30, in an example implementation, is maintained as generally horizontal.

The trifold table 20 has a generally planar and rigid second panel, referenced as a close folding panel 40 for its close contact with the base panel 30 in the folded condition of the trifold table 20. The close folding panel 40 is pivotally attached to the base panel 30 by hinges 60. A generally planar and rigid third panel is referenced as the spaced folding panel 50 for its vertical offset from the base panel 30 in the folded condition (FIG. 2) of the trifold table 20 to accommodate the close folding panel 40 therebetween.

Figure 5:
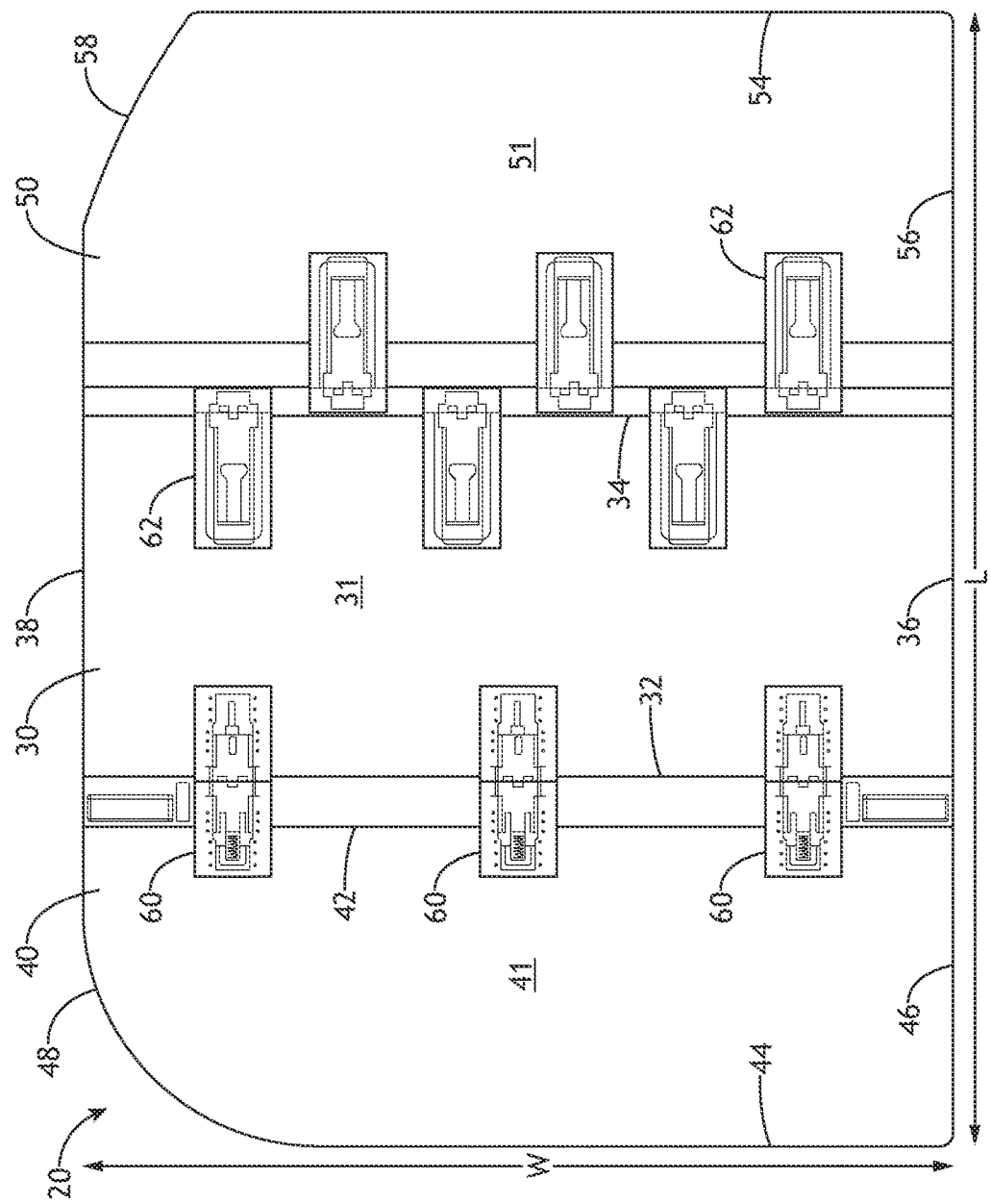
FIG. 5 is an overhead enlarged view of the trifold table of FIG. 1 in the unfolded condition.

In the unfolded and flat condition of the trifold table 20 as illustrated in FIG. 5, the top side 31 of the base panel 30, the top side 41 of the close folding panel 40, and the top side 51 of the spaced folding panel 50, are essentially coplanar to serve together as a table top. The base panel 30 has a first linear end 32 pivotally attached to a proximal linear end 42 of the close folding panel 40 by first hinges 60. The first hinges may be dampened hinges in a particular embodiment as described below. A second linear end 34 of the base panel 30 is attached by second hinges 62 to a proximal linear end of the spaced folding panel 50. The second hinges 62 accommodate the vertical offset of the spaced folding panel 50 from the base panel 30 in the folded condition of the trifold table 20.

Figure 2:
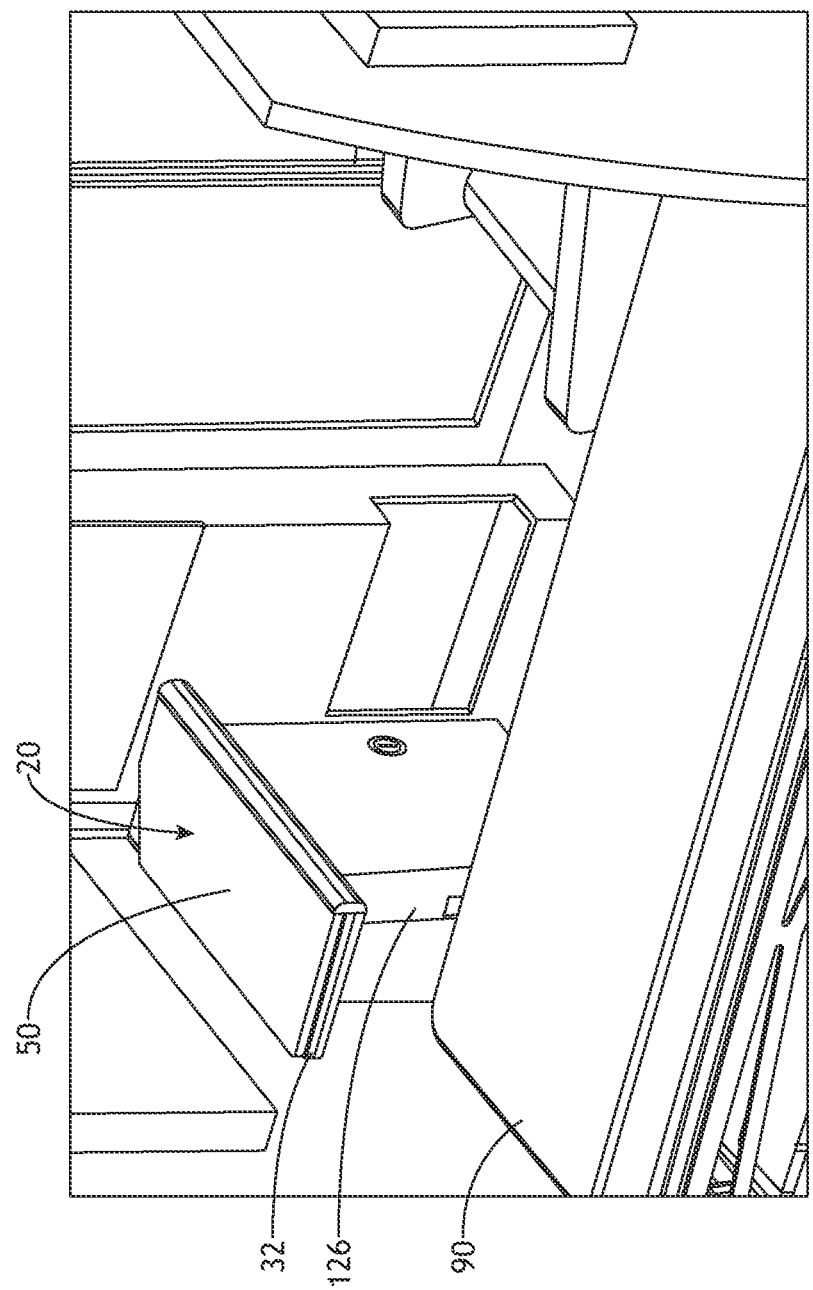
FIG. 2 is a perspective view of the passenger suite of FIG. 1, shown with the trifold table in a stowed position and a folded condition.
Figure 3:
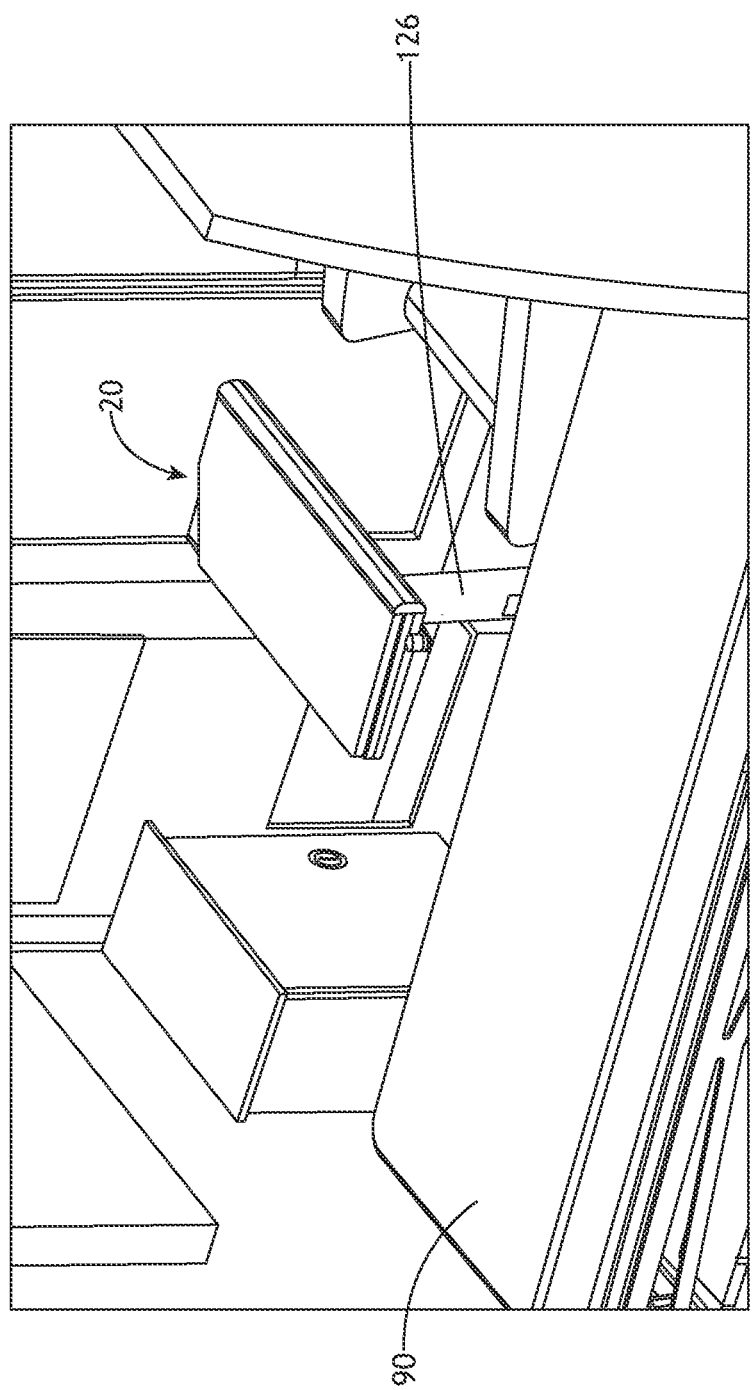
FIG. 3 is a perspective view as in FIG. 2, with the trifold table folded in a deployed position.
Figure 4:
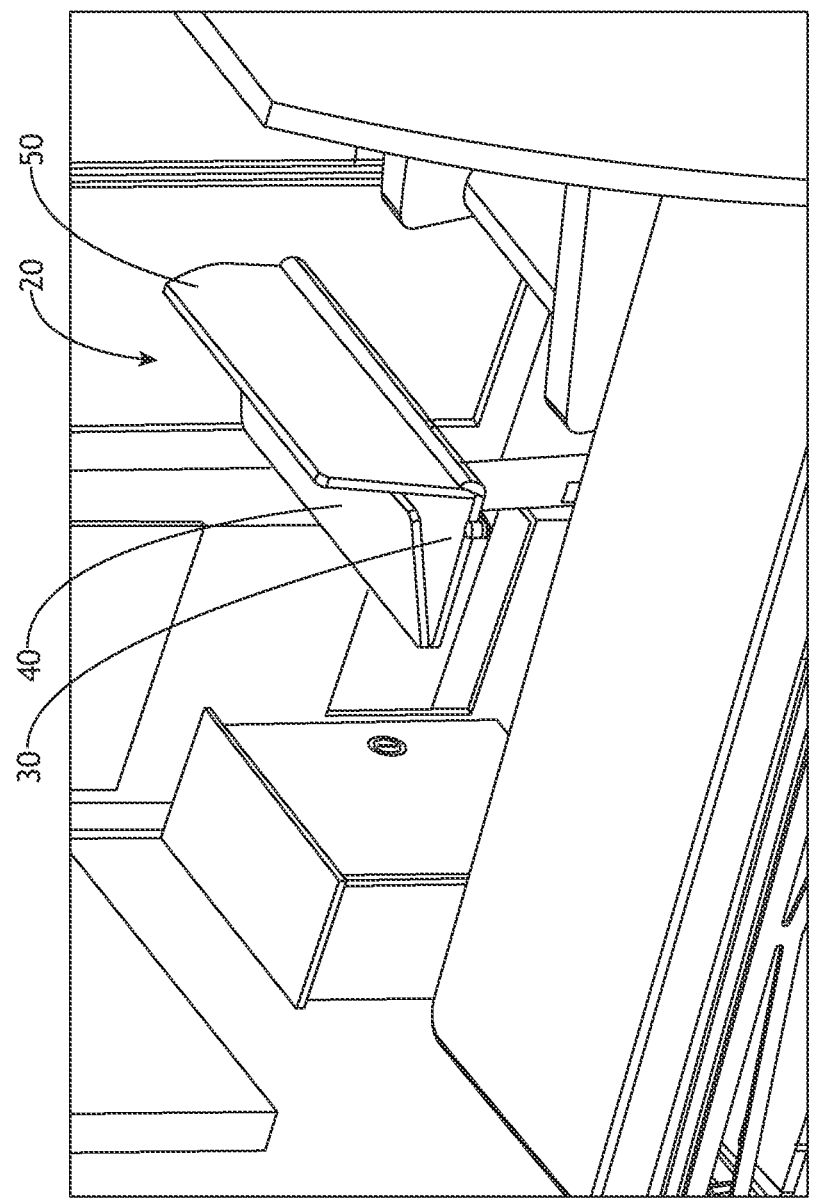
FIG. 4 is a perspective view as in FIG. 3, shown with the trifold table partially unfolded in the deployed position.

The close folding panel 40 and spaced folding panel 50 have respective free distal ends 44 and 54 that define the deployed ends of the trifold table 20 in the unfolded condition. As the trifold table 20 transitions from the folded condition through the partially folded condition to the unfolded condition, the close folding panel 40 and spaced folding panel 50 pivot at their attached proximal ends as their free distal ends 44 and 54 travel to their destinations. The close folding panel 40 should transition ahead of the spaced folding panel 50 when folding the trifold table 20, keeping the close folding panel 40 closer to the base panel 30 than the spaced folding panel 50, to permit a stacked stable folded condition (FIGS. 2, 3).

The base panel 30, the close folding panel 40, and the spaced folding panel 50 have generally the same widths W, defining the general width of the table in any folded or unfolded condition. They have generally the same lengths as well, the sum of which approximately defines the length L of the trifold table 20 in the unfolded condition. That they have the same lengths and widths also provides a neat appearing assembly in the stacked folded condition in which exposed ends and sides align without considerable overhangs.

The base panel 30 is rectangular, having linear first and second sides 36 and 38, which are perpendicular to the linear first and second ends 32 and 34. The close folding panel 40 and the spaced folding panel 50 have respective linear first sides 46 and 56 defining, together with the first linear side 36 of the base panel 30, a first linear side 26 of the trifold table 20 in the unfolded condition. The respective second sides 48 and 58 of the close folding panel 40 and spaced folding panel 50, opposite the first sides 46 and 56, together with the second side 38 of the base panel, define a second side 28 of the trifold table 20. The respective second sides 48 and 58 are arcuate near the distal ends 44 and 54, such that the corners of the second side 28 of the deployed trifold table 20 are tapered, rounded, or beveled for safety and aesthetic purposes.

The first hinges 60, by which the close folding panel 40 is attached to the base panel 30, permit them to stack or overlap as they are folded together. The first hinges 60 furthermore permit the close folding panel 40 and base panel 30 to align and contact at their attached linear ends 42 and 32 in the unfolded planar condition. The first hinges 60 may be biased toward relative positions of the base panel 30 and close folding panel 40 that are intermediate positions between the limits of their relative motion range, which are the planar fully unfolded position (FIGS. 1, 5) and the stacked fully folded position (FIGS. 2, 3). This slows hinging movement as the limits of their motion range are approached. This also provides lift assistance when a user pivotally raises the close folding panel 40 from either limit of its motion range, which are horizontal and relatively low positions.

The hinges 60 may also or furthermore be motion-dampening at the limits of their motion range. This provides braking of the pivoting movement of the close folding panel 40 at it approaches the limits of its motion range, reducing clatter noise as the table is folded and unfolded. Dampening may be applied by the hinges 60, against folding toward the fully folded condition when the angle between the top side 31 of the base panel 30 and the top side 41 of the close folding panel 40 is in a range of approximately 30 degrees (30°) to 0 degrees (0°) such that dampening against further folding is applied at 30 degrees (30°) and increases as the fully folded condition is further approached. Dampening may also applied by against unfolding toward the planar condition when the angle between the top side 31 and the top side 41 is in a range of approximately 150 degrees (150°) to 180 degrees (180°) such that dampening against further unfolding is applied at 150 degrees (150°) and increases as the planar condition is further approached.

The second hinges 62 may provide similar beneficial functions, including biasing and motion dampening, at the limits of the motion range of the spaced folding panel 50. The first hinges 60 and second hinges 62 provide positive stopping when the planar unfolded condition is reached to provide a firm planar table top. In any position, the close folding panel 40 and the spaced folding panel 50 are entirely supported by the base panel 30. Particularly, the close folding panel 40 and the spaced folding panel 50 are supported by the base panel 30 and hinges in cantilever fashion.

Returning to FIG. 1, the passenger suite 70 in which the trifold table 20 can be deployed includes a first end wall 72 behind a passenger seat 74, and a second end wall 76 forward of the passenger seat 74. The passenger-right sidewall 80 of the suite includes a movable door 82 that translates forward or aft from the illustrated closed position to an open position to permit entry and egress of occupants from and to an aisle of the aircraft. The passenger-left edges 84 of the end walls 72 and 76 are shown as arcuate to match the contour of an aircraft fuselage and to imply a corresponding passenger-left sidewall of the passenger suite 70.

Figure 11:
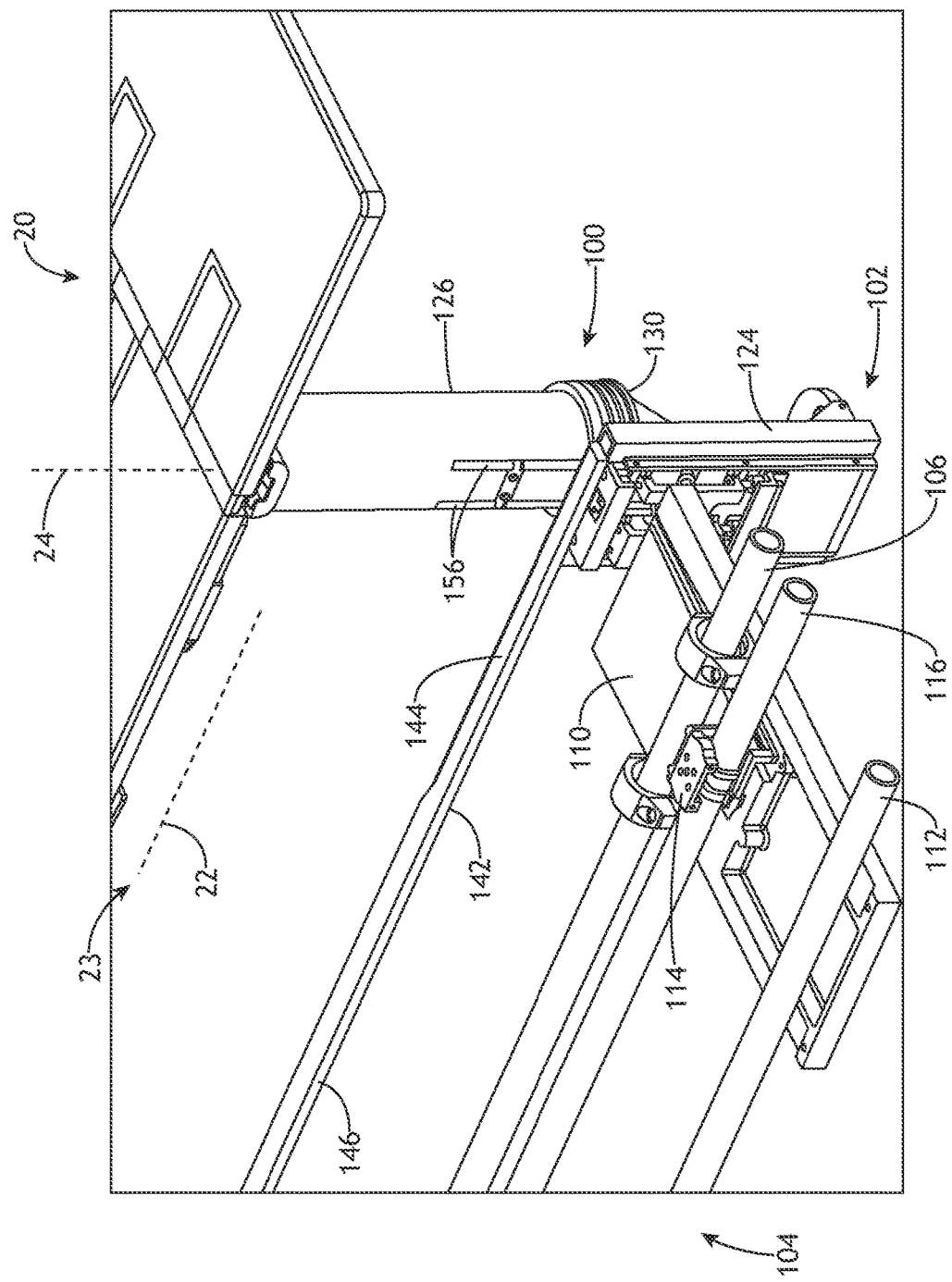
FIG. 11 is a perspective view of a portion of the trifold table of FIG. 1 and a support column and rail assembly.

A media display screen 86 is shown as mounted on the second end wall 76, represented as the forward end of the passenger suite. A longitudinally extending bed 90 is shown from the first end wall 72 to the second end wall 76 along the left side of the passenger suite. The support assembly 100 that carries the table 20 includes a carriage 102 (FIG. 11), that is mounted on a stationary rail assembly 104. The rail assembly is fixed or stationary relative to a fixed monument, referenced for example, as a bed 90 having a frame 92 along which or to which the rail assembly 104 is fixed. The rail assembly 104 includes a longitudinally extending first rail 106 upon which a sled 110 of the carriage is mounted. The sled is attached to a longitudinally spaced pair of rings that slide along the first rail. The rail assembly includes a longitudinally extending second rail 112 abutted from below by a distal end of the sled. The first rail 106 supports the sled and support assembly 100 and acts as a fulcrum. The moment of the support assembly 100 at the first rail 106 is countered by the second rail 112 and distal end of the sled 110 to maintain the sled as generally horizontal, the support assembly 100 as generally vertical, and the base panel 30 of the trifold table 20 as horizontal.

Figure 12:
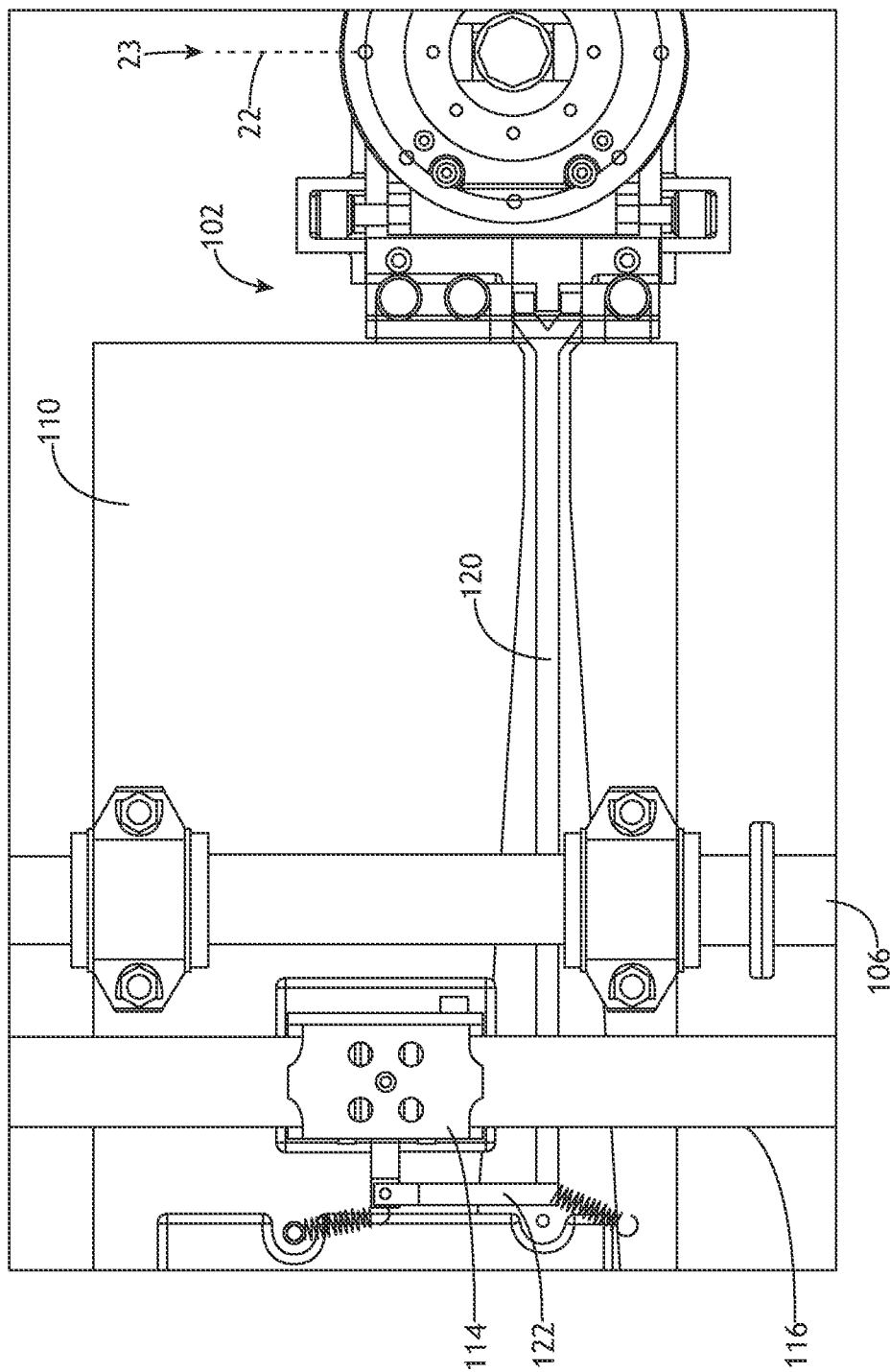
FIG. 12 is a bottom view of portions of the support column and rail assembly of FIG. 11.

The carriage 102 moves longitudinally along the first rail 106 and second rail 112 when a brake 114 is in a freed condition. The brake is attached to the sled and selectively engages a longitudinally extending third rail 116 of the rail assembly between the first rail 106 and second rail 112. The brake 114 (FIG. 12) is automatically maintained in a braked condition by springs carried by the sled. In the absence of external force on the trifold table, for example by user action, the brake in the braked condition prevents movement of the support column 126 and table 20 along the rail assembly 104 in either longitudinal direction. This maintains the sled 110 and table therewith in any current position on the rail assembly. When an external force is applied to the table 20, for example when a user applies fore or aft force upon the table 20, the brake 114 is switched to the freed condition. When a user applies fore or aft force upon the table 20, a first linkage 120 coupled to the base panel 30 pivots about a post connected to the sled of the carriage. The first linkage thereby moves a second linkage 122 against the otherwise balanced forces of the springs, and the second linkage switches the brake 114 to the freed condition, permitting movement of the trifold table in the direction in which user force is applied. The rails 106, 112, 116 are tubular in the illustrated embodiment, for smooth motion of the sled along the rails.

Thus, by intuitive user action applying force in the first longitudinal direction 23 upon the trifold table, the table can be moved, for example, in a rearward or aft direction from the forward stowed position of FIG. 2 toward the passenger seat progressively to the deployed position of FIG. 3. The trifold table can be returned forward to the stowed position by a user applying force in a second longitudinal direction 25 opposite the first direction 23. This described example, in which the table is moved by user applied force, is a non-limiting example. In some implementations, movement of the table, for example in the fore and aft directions, is motorized.

Figure 6:
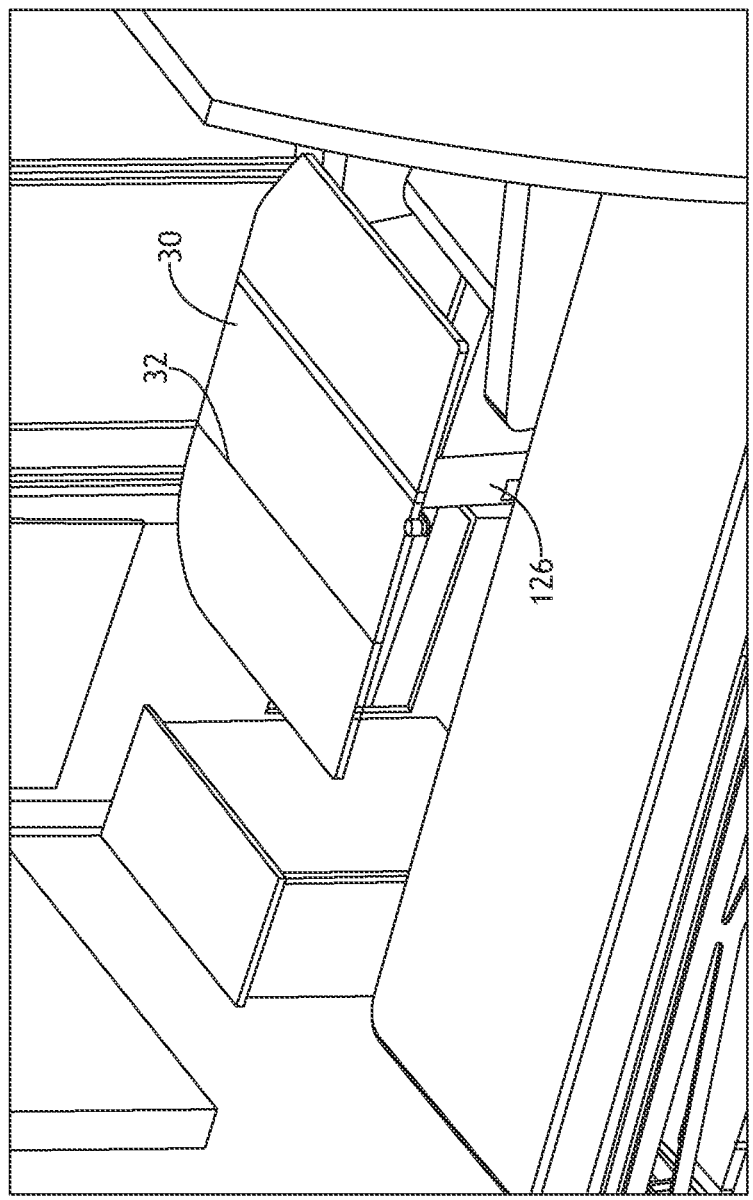
FIG. 6 is a perspective view of the trifold table of FIG. 1, in a raised vertical position thereof.
Figure 7:
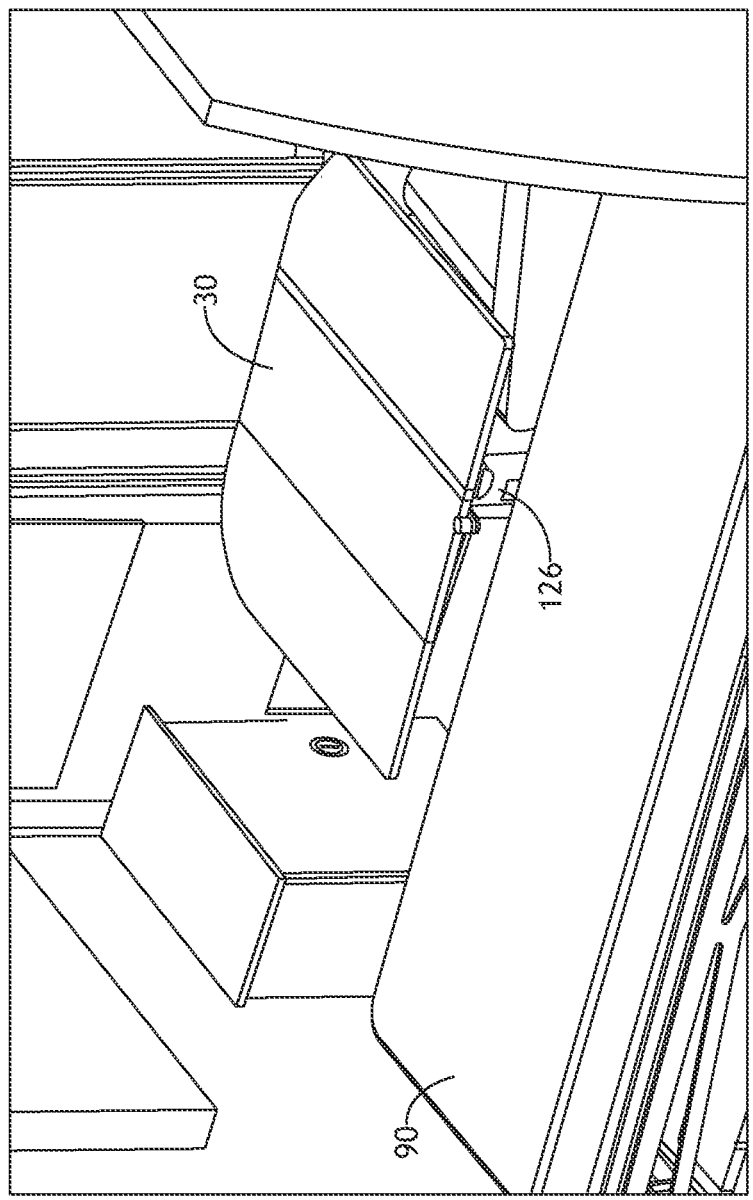
FIG. 7 is a perspective view as in FIG. 6, showing the trifold table in a lowered vertical position thereof.

The vertical position of the trifold table is adjustable. The carriage 102 includes a vertical bracket 124 connected to a side of the sled 110 facing outward from the rails. A support column 126 extends upward from the vertical bracket and supports the trifold table. An elevating shelf 130, which carries the support column, is mounted on the vertical bracket by way of rollers and is vertically movable along the bracket. By vertical movement of the elevating shelf 130, the support column 126 and the trifold table 20 thereon can be adjustably raised and lowered as represented in FIGS. 6 and 7. The elevating shelf is selectively permitted and restricted from vertical movement by a user actuatable elevation locking mechanism. The elevation locking mechanism in the illustrated embodiment is a gas cylinder device 132 disposed along the vertical axis 24 and having a lower end connected to a bottom plate of the vertical bracket 124 and an upper end connected to the base panel 30 of the trifold table. In a locked condition of the gas cylinder device, the vertical position of the trifold table relative to the bottom plate of the vertical bracket is fixed, preventing the elevating shelf and trifold table from raising or lowering. In an unlocked condition of the gas cylinder device, the vertical position of the trifold table is permitted to raise and lower by extension and withdrawal of a piston of the gas cylinder, permitting the elevating shelf to raise and lower.

Figure 13:
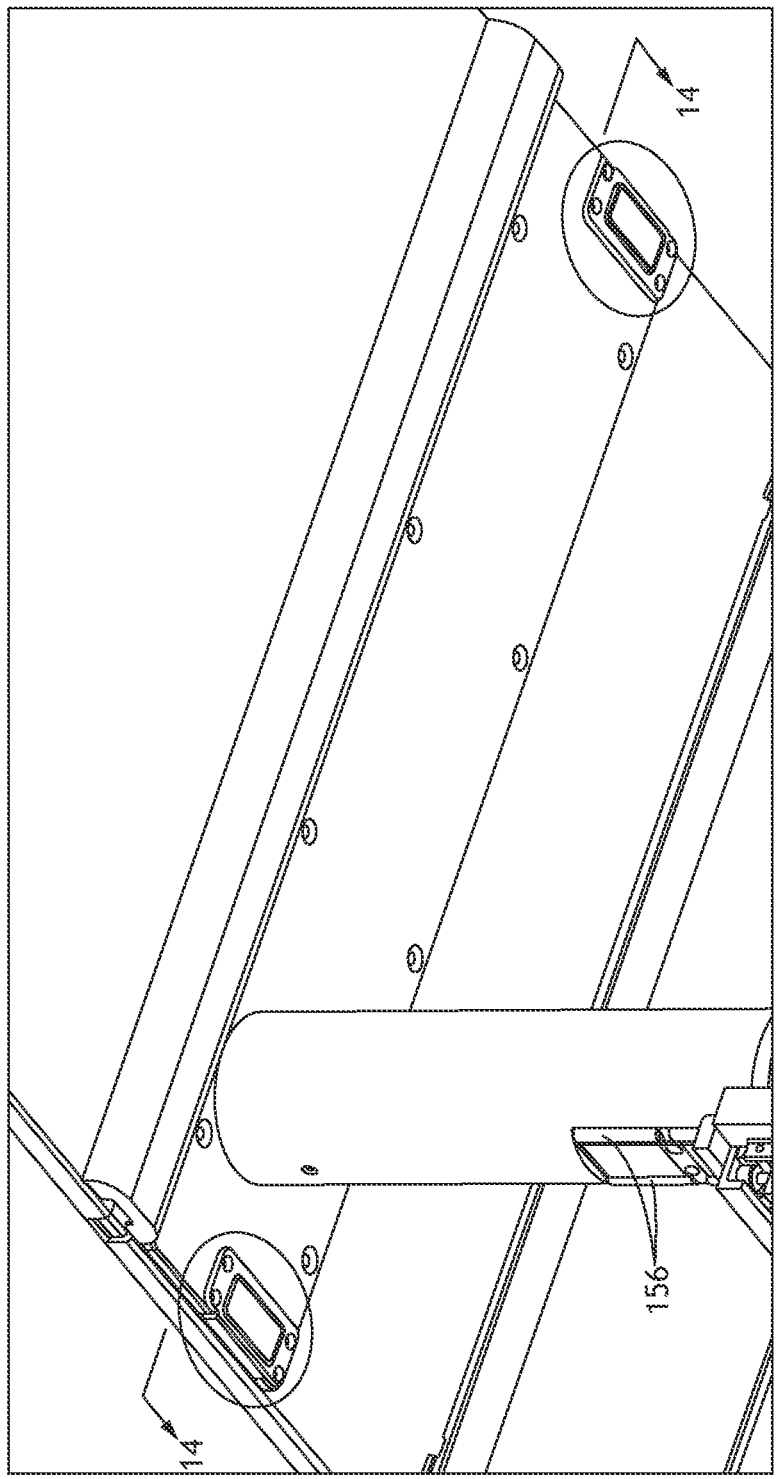
FIG. 13 is a perspective view of a lower side of the trifold table of FIG. 1.
Figure 14:
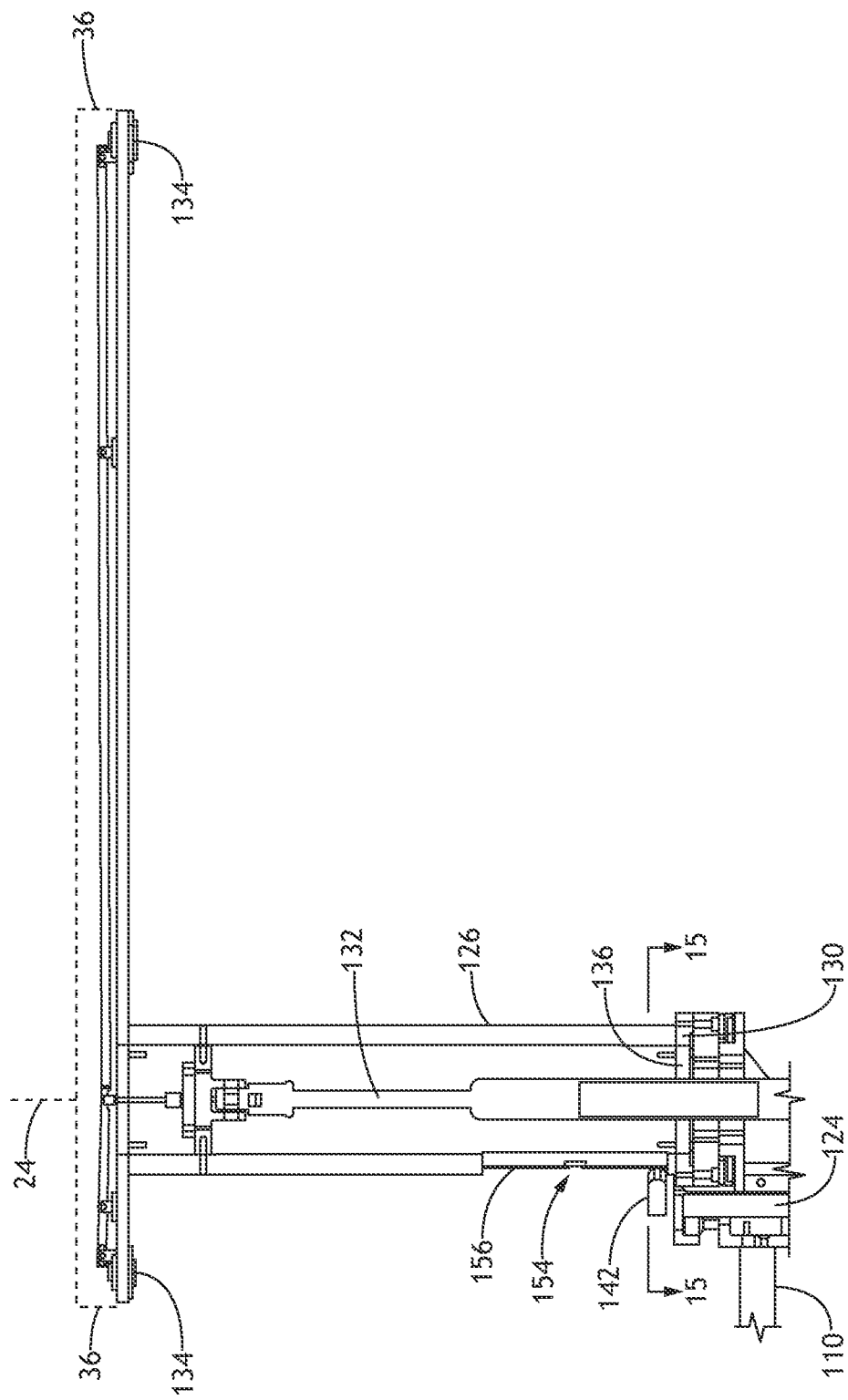
FIG. 14 is a forward directed cross section view, taken at the lines 14-14 in FIG. 13.

The elevation locking mechanism is selectively locked and unlocked by actuation of either of two buttons 134, each of which is mounted along the lower side of the base panel 30 near a respective linear side 36 as shown in FIGS. 13 and 14. A user presses either button to unlock the locking mechanism to permit raising and lowering of the trifold table by further lifting or pressing on the table. See FIGS. 6 and 7, for example, which show the trifold table 20 in a relatively raised vertical position and a relatively lowered vertical position, respectively. The elevation locking mechanism may be considered a vertical movement brake, whereas the brake 114 may be considered a horizontal or translational movement brake.

Figure 8:
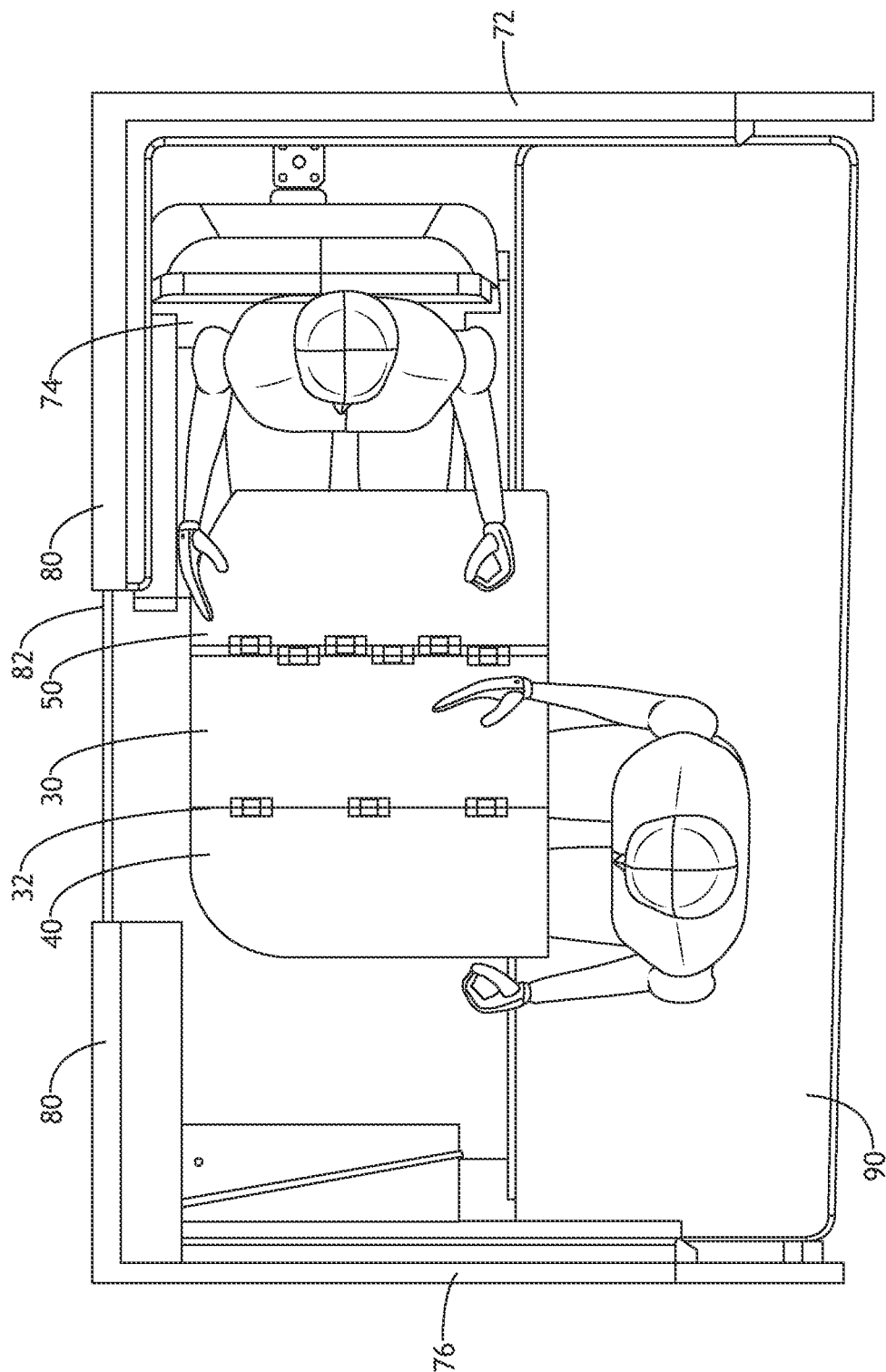
FIG. 8 is an overhead view of the passenger suite of FIG. 1, showing the trifold table in use in the orientation of FIG. 1.
Figure 9:
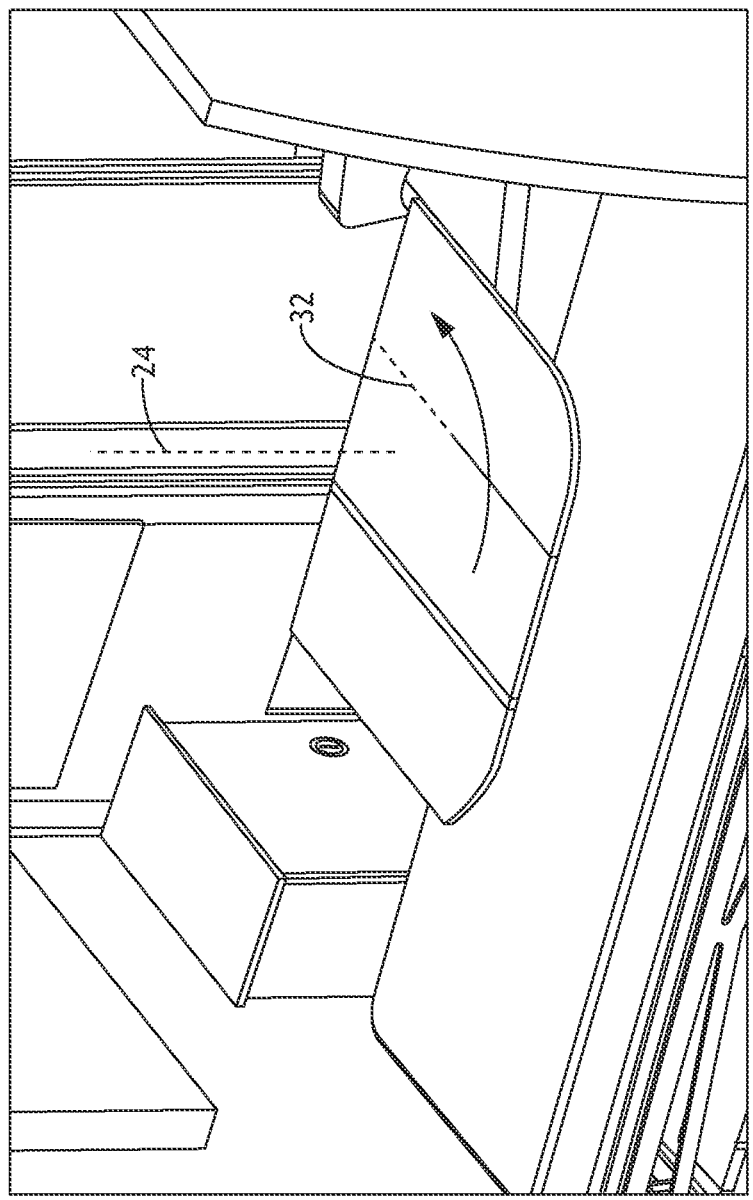
FIG. 9 is a perspective view of the trifold table in a rotated position relative to that of FIG. 8.
Figure 10:
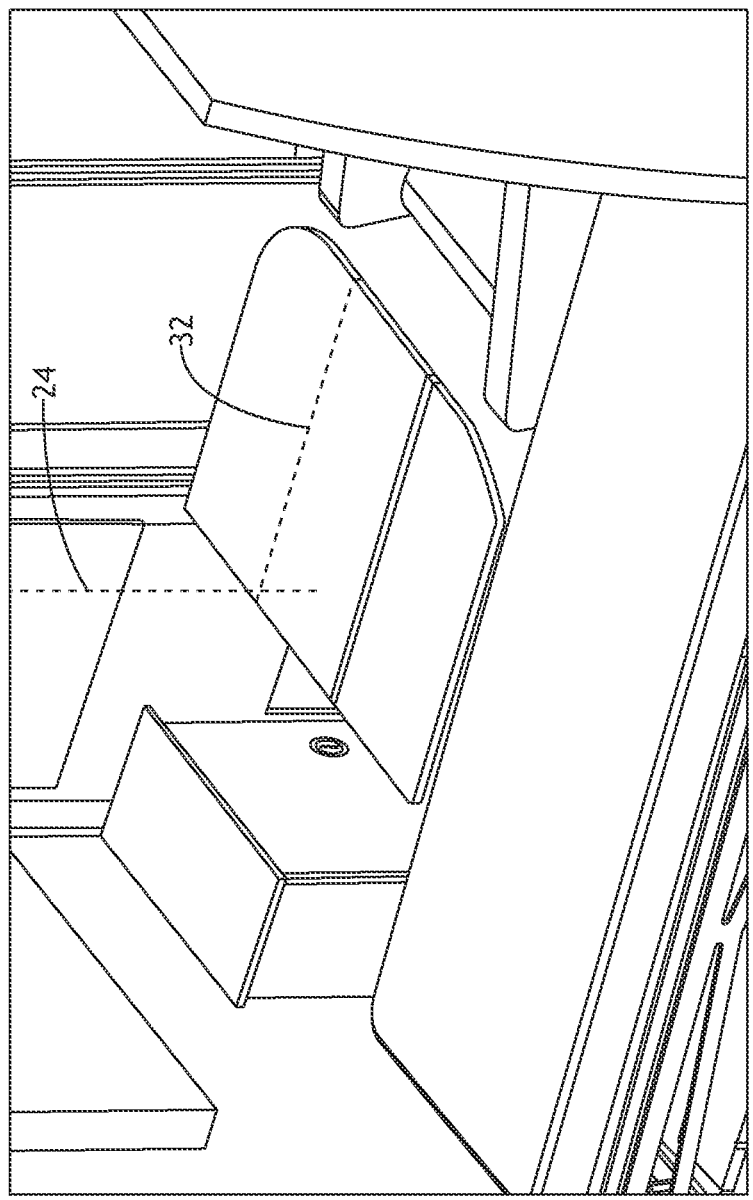
FIG. 10 is a perspective view of the trifold table in another rotated position relative to that of FIG. 8.

The lower end of the support column 126 is connected to the elevating shelf 130 by a roller bearing assembly 136 (FIG. 14) to facilitate rotation of the column around the vertical axis 24. The roller bearing assembly houses wave washers and friction pads to apply mild resistance against rotational movement. The resistance is overcome by external force such as user action applying torque to rotate the trifold table to a desired orientation, but the resistance prevents unwanted spinning or swaying of the table in the absence of external force. See FIGS. 8-10, in which the trifold table 20 is shown in several rotational positions in the unfolded condition.

The trifold table 20 is permitted to rotate in deployed positions of the passenger suite 70 where the dimensions of the table in the unfolded condition (FIGS. 8-10) can be accommodated. Furthermore, for compact stowing of the trifold table at the forward second end wall 76 of the passenger suite 70 (FIG. 2), a particular linear end 32 of the base panel must face the wall 76, and be oriented perpendicular relative to the longitudinal axis 22, in order for the trifold table 20 to be permitted to approach the wall 76 by the rail assembly. This orientation defines a predetermined stowage orientation. Note also that the fully stowed position of FIG. 2 can only be reached when at least the close folding panel 40 is in a folded condition relative to the base panel 30 with the first linear end 32 of the base panel 30 facing and adjacent the wall 76.

A control feature automatically prevents or permits the support column 126 and trifold table 20 to rotate according to the position of the support column along the longitudinal axis 22; and automatically permits the support column 126 and trifold table 20 to move longitudinally forward beyond a predetermined position only when the table is in the predetermined stowage orientation, in which the first linear end 32 faces the wall 76. These control features are facilitated by a stationary control rail 142 that automatically engages the support column 126 according to the longitudinal position and rotational orientation of the column 126.

The stationary control rail 142, which may be considered part of the afore-described rail assembly 104, is connected to a frame of the bed 90 and extends parallel to the longitudinal axis 22. The control rail 142 has a rearward first portion 144 (FIG. 15), the length of which defines a range of longitudinal positions of the trifold table 30 in which rotation is permitted. The control rail 142 has a forward second portion 146, the length of which defines the range of longitudinal positions of the trifold table 30 in which rotation is prevented.

Figure 15:
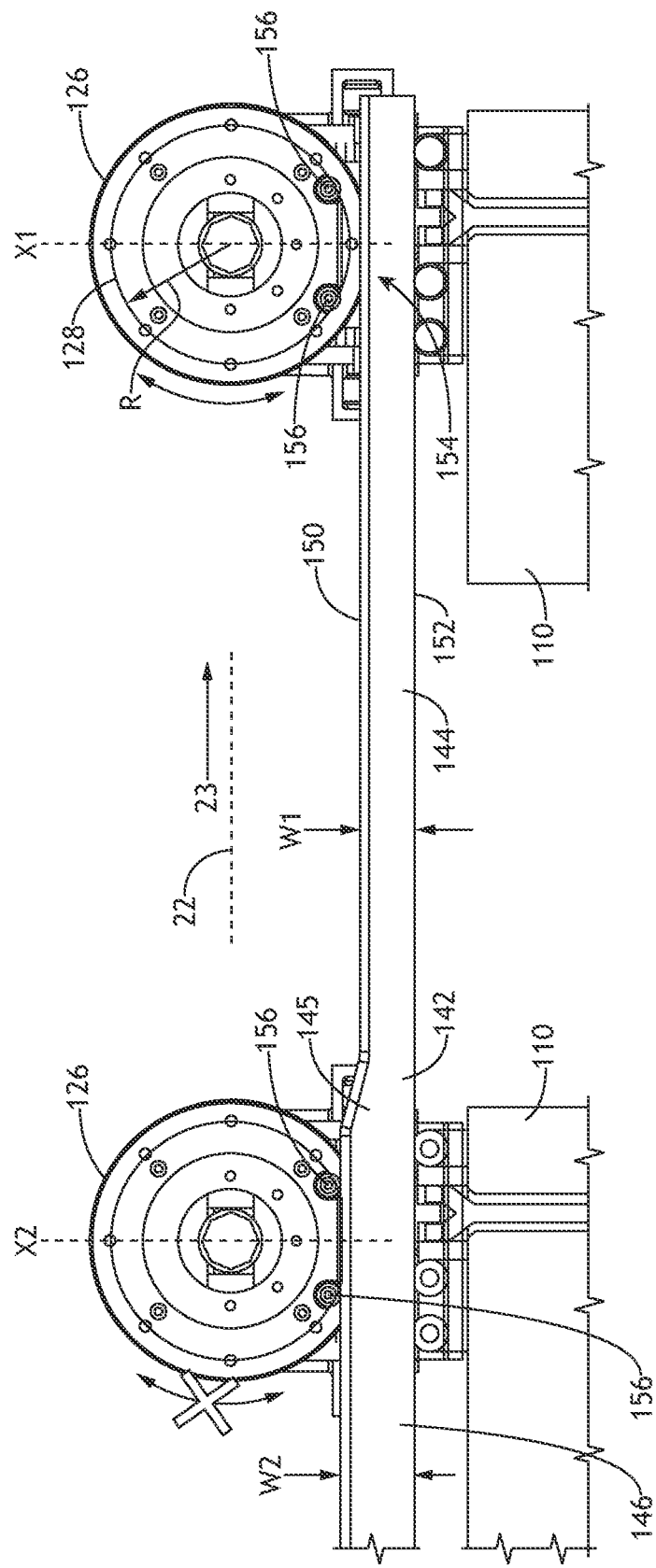
FIG. 15 is a downward directed cross section view, taken at the lines 15-15 in FIG. 14, showing a lower portion of the support column at two longitudinal positions to illustrate rotational locking and unlocking.

FIG. 15 shows the carriage and support column from below in two positions (X1, X2) along the control rail 142 to illustrate rotational unlocking and locking at positions along the rearward first portion 144 and forward second portion 146 respectively, which are shown in part at least. The control rail 142 has a first lateral side 150 facing the support column and a second lateral side 152 facing oppositely. The second lateral side 152 is linear. The first lateral side 150 is linear along the first portion 144 of the control rail; and the first lateral side is linear along the second portion 146 as well. However, the two linear portions 144 and 146 of the first side 150 are offset, such that a lateral width W1 of the first portion 144 of the control rail 142 is lesser than a lateral width W2 of the second portion 146. The width of the control rail 142 transitions from W1 to W2 at a junction 145 of the first portion 144, which extends in the first longitudinal direction 23 from the junction 145, and the second portion 146, which extends in the second longitudinal direction 25 from the junction.

The support column 126 includes a radially reduced portion 154 (FIG. 14) to accommodate the greater lateral width W2 of the second portion 146 of the control rail 142.

In the illustrated embodiment, at least a portion of the support column 126 has a vertical circular cylindrical wall 128 having a radius R (FIG. 15), and the radially reduced portion 154 is formed by a chord surface. A chord of a circle is a straight line segment whose endpoints both lie on the circle. The support column 126 can travel along the rail assembly 104 forward from the first portion 144 of the control rail 142 only in the predetermined stowage orientation, in which the radially reduced portion 154 faces the control rail 142 to accommodate the greater width W2. The reduced portion 154 extends vertically to accommodate vertical positions of the trifold table. The support column includes a pair of rollers 156 extending vertically at vertical edges of the reduced portion to guide or ease transition, for example to assist a user in finding the predetermined stowage orientation, in which the first linear end 32 faces the wall 76, to permit forward movement along the second portion 146 of the control rail 142.

When the support column 126 and trifold table 20 are positioned adjacent the first portion 144, for example as represented at the first position X1 in FIG. 15, the support column and rollers 156 are disengaged from the control rail 142, permitting rotation of the support column and trifold table 20. When the support column 126 and trifold table 20 are positioned adjacent the second portion 146, for example as represented at the first position X2 in FIG. 15, the chord surface of the support column and the rollers 156 are engaged with or are at least in close proximity with the control rail 142, preventing rotation of the support column and trifold table from the predetermined stowage orientation. When the reduced portion 154 (FIG. 14) and rollers 156 are not oriented toward the control rail 142, the trifold table is not in the predetermined stowage orientation, and the support column 126 accordingly cannot travel forward from the first portion 144, because the support column 126, by hitting the junction 145 (FIG. 15), cannot travel forward to positions adjacent the second portion 146. However, by rotation of the trifold table 20 and support column 126 to the predetermined stowage orientation, the support column 126 can travel forward from the junction 145 to positions adjacent the second portion 146 of the control rail 142, for example to the stowed position of FIG. 2, while being prevented from rotating from the predetermined stowage position.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An aircraft passenger suite defined by at least one privacy wall, comprising:
   a passenger seat;
   a fixed rail assembly attached to a monument;
   a support column rotatably mounted on the rail assembly; and
   a table mounted on the support column, the table having a stowed position, and the table having deployed positions in a first direction generally toward the passenger seat from the stowed position;
   wherein the table has a predetermined stowage orientation in which the support column and table are movable along the rail assembly in a second direction opposite the first direction to the stowed position, and the rail assembly prevents the table from moving into the stowed position when the table is rotated out of the predetermined stowage orientation; and
   wherein the rail assembly comprises a control rail having a first portion extending in the first direction and along which the support column and table are rotatable around a vertical axis defined by the support column, and a second portion extending in the second direction and along which the support column and table are not rotatable around the vertical axis.

2. The aircraft passenger suite of claim 1, wherein:
   the first portion of the control rail has a first lateral width;
   the second portion of the control rail has a second lateral width greater than the first lateral width; and
   the support column has a radially reduced portion that faces the control rail when the table is in the predetermined stowage orientation.

3. The aircraft passenger suite of claim 2, wherein at least a portion of the support column has a vertical circular cylindrical wall having a radius.

4. The aircraft passenger suite of claim 3, wherein the radially reduced portion is formed by a chord surface.

5. The aircraft passenger suite of claim 1, further comprising a brake that automatically prevents movement of the support column and table along the rail assembly in a braked condition, wherein, when a user applies force in the first direction or second direction, the brake is switched to a freed condition permitting movement of the table along the rail assembly.

6. The aircraft passenger suite of claim 1, wherein a vertical position of the table is adjustable.

7. The aircraft passenger suite of claim 1, wherein the table comprises a base panel mounted on the support column, and a first folding panel pivotally attached to the base panel, wherein the first folding panel is pivotable relative to the base panel between a folded position and an unfolded position.

8. The aircraft passenger suite of claim 7, wherein the table comprises a second folding panel pivotally attached to the base panel.

9. The aircraft passenger suite of claim 7, further comprising a wall positioned forward of the passenger seat in the second direction, wherein the base panel has a first linear end to which the first folding panel is pivotally attached, and wherein the predetermined stowage orientation is defined by the first linear end facing the wall.

10. The aircraft passenger suite of claim 9, wherein, in the stowed position of the table, the first folding panel is in the folded position and the first linear end of the base panel faces, and is adjacent, the wall.

11. The aircraft passenger suite of claim 1, wherein the monument comprises a bed.

12. An adjustable table assembly installable in a passenger cabin environment, the table assembly comprising:
   a fixed rail assembly attachable to a fixed structure in a passenger cabin;
   a support column rotatably mounted on the rail assembly; and a table mounted on the support column, the table having a stowed position, and the table having deployed positions in a first direction from the stowed position;

wherein the table has a predetermined stowage orientation in which the support column and table are movable along the rail assembly in a second direction opposite the first direction to the stowed position, and the rail assembly prevents the table from moving into the stowed position when the table is rotated out of the predetermined stowage orientation;

wherein the table comprises a base panel mounted on the support column, and a first folding panel pivotally attached to the base panel, wherein the first folding panel is pivotable relative to the base panel between a folded position and an unfolded position; and wherein the base panel has a first linear end to which the first folding panel is pivotally attached, and wherein the predetermined stowage orientation is defined by the first linear end facing the second direction or the first direction.

13. The table assembly of claim 12, wherein the rail assembly comprises a control rail having a first portion extending in the first direction and along which the support column and table are rotatable around a vertical axis defined by the support column, and a second portion extending in the second direction and along which the support column and table are not rotatable around the vertical axis.

14. The adjustable table assembly of claim 13, wherein:
the first portion of the control rail has a first lateral width;
the second portion of the control rail has a second lateral width greater than the first lateral width; and
the support column has a radially reduced portion that faces the control rail when the table is in the predetermined stowage orientation.

15. The adjustable table assembly of claim 14, wherein at least a portion of the support column has a vertical circular cylindrical wall having a radius.

16. The adjustable table assembly of claim 12, further comprising a brake that automatically prevents movement of the support column and table along the rail assembly in a braked condition, wherein, when a user applies force in the first direction or second direction, the brake is switched to a freed condition permitting movement of the table along the rail assembly.

17. The adjustable table assembly of claim 12, wherein a vertical position of the table is adjustable.

* * * * *